July 6, 1954 — W. P. OEHLER ET AL — 2,682,737
LATCH BOX FOR DISK HARROWS
Original Filed June 27, 1949 — 2 Sheets-Sheet 1
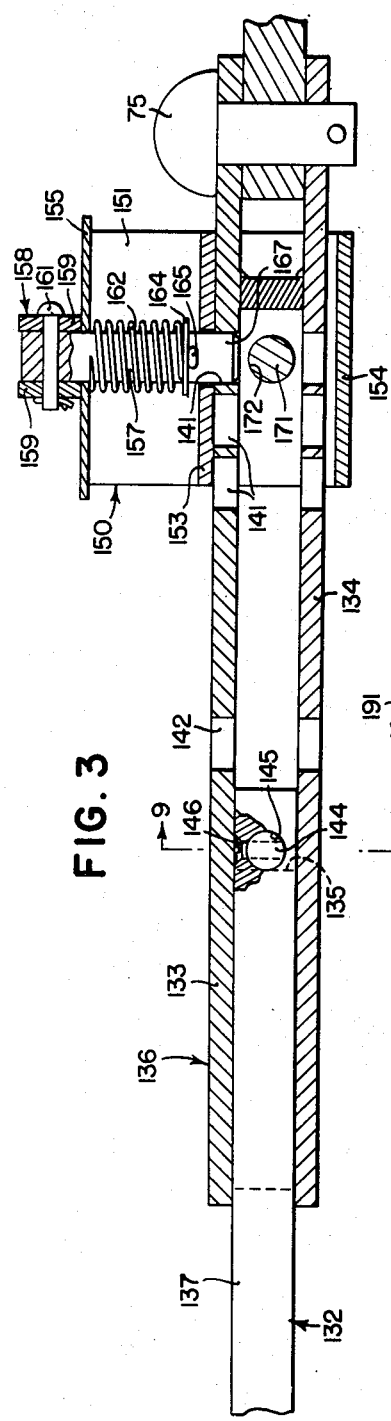
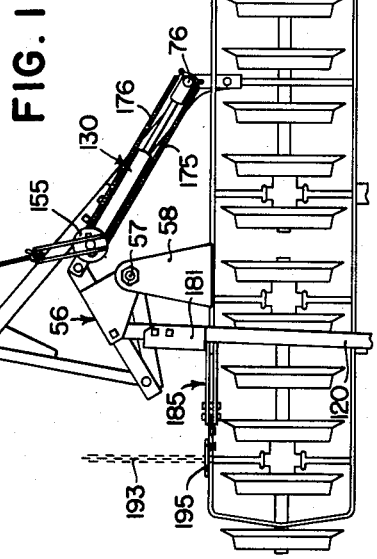
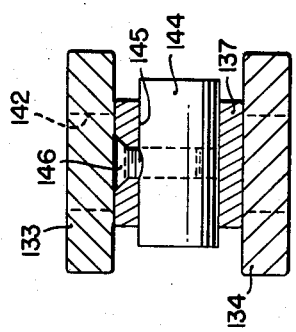
INVENTORS.
WILLIAM P. OEHLER
CHARLES H. YOUNGBERG
ATTORNEYS

INVENTORS.
WILLIAM P. OEHLER
CHARLES H. YOUNGBERG
BY
ATTORNEYS

Patented July 6, 1954

2,682,737

UNITED STATES PATENT OFFICE 2,682,737

LATCH BOX FOR DISK HARROWS

William P. Oehler and Charles H. Youngberg, Moline, Ill., assignors to Deere & Company, Moline, Ill., a corporation of Illinois Original application June 27, 1949, Serial No. 101,534. Divided and this application October 7, 1950, Serial No. 189,014

4 Claims. (Cl. 55—81)

This application is a division of our co-pending application Serial No. 101,534, filed June 27, 1949.

The present invention relates generally to agricultural implements and more particularly to offset disk harrows.

The object and general nature of the present invention is the provision of a disk harrow of the offset type having front and rear gangs normally movable from a straightened parallel or transport position into an angled or working position as an incident to the soil pressure acting against the disks when the machine is propelled forwardly, but which does not require any locks, latching means or the like for holding the disks at the desired angle, irrespective of adverse soil conditions and/or variations in soil conditions or the like.

More particularly, it is a feature of this invention to provide a disk harrow of the offset type which is specially constructed and arranged to be hitched to a farm tractor and operated thereby conveniently and efficiently. More specifically, it is a feature of this invention to provide an offset disk horrow incorporating a linkage acting between the front and rear gangs and connected to one side of the hitch structure for the harrow so that the force of the draft acting on the linkage for swinging the rear gang relative to the front gang with an angled or working position so acts at such mechanical advantage that soil pressure acting against the disks, particularly on the disks of the rear gang, is not effective to swing the gangs into a position of lesser angle, yet the linkage and associated parts are so arranged that swinging of the gangs into their transport or parallel straightened position may easily and quickly be effected.

A further feature of this invention is the provision of a new and improved angling or control mechanism which is particularly adapted for use with the above mentioned offset disk harrow and which will permit straightening and angling the gangs from the tractor seat and without requiring that the tractor have implement-operating power cylinders or the like. It is a further feature of this invention to provide an angle control means so constructed and arranged that backing the harrow will automatically bring the harrow gangs into a straightened position facilitating rearward movement of the harrow. Another feature of this invention is the provision of a right-turn control particularly adapted for use with a harrow having an angle control of the above type, namely, one in which when the outfit is backed the gangs are normally restrained against movement beyond their straightened position, the right-turn control being constructed and arranged to override such restraint, whereby the harrow may readily be moved into the opposite angle, when desired, as to facilitate a right turn (assuming that the harrow is normally arranged to turn to the left).

Still further, another feature of the present invention is the provision of new and improved right-turn mechanism which responds to a turn of the tractor to the right but which operates entirely independent of the angling mechanism; that is, without losing the setting of the angle control means.

These and other objects and advantages of the present invention will be apparent to those skilled in the art after a consideration of the following detailed description, taken in conjunction with the accompanying drawings, in which:

Figure 1 is a fragmentary plan view of an offset disk harrow incorporating the present invention, the harrow being shown in transport or straightened position.

Figure 3 is a sectional view taken generally along the line 8—8 of Figure 2.

Figure 4 is a sectional view taken along the line 9—9 of Figure 3.

Figure 2:
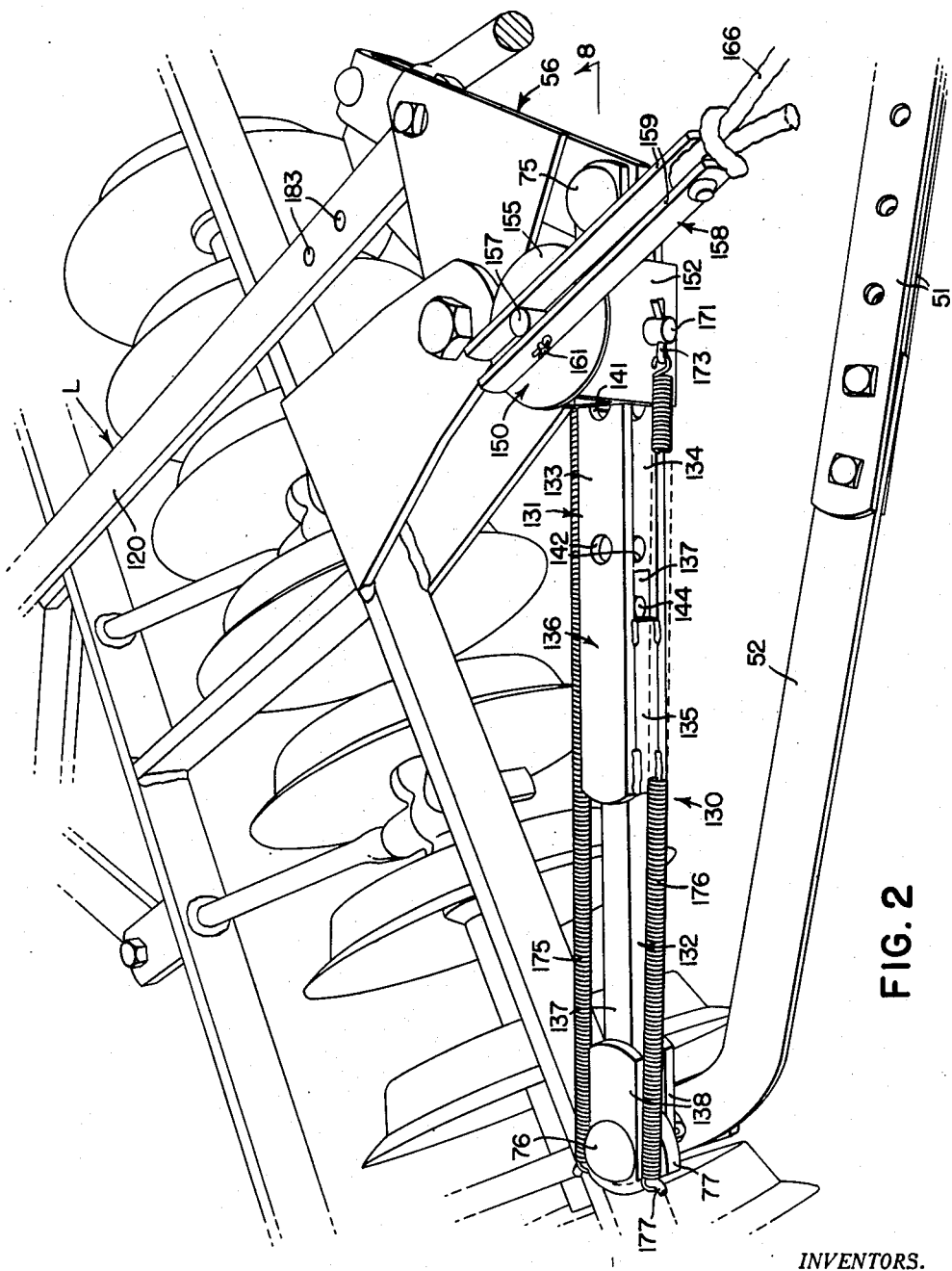
Figure 2 is a perspective view of the angle control unit incorporated in the harrow shown in Figure 1 and with which the present invention is more particularly concerned.

Referring now to the drawings, the offset disk harrow which has been chosen to illustrate the principles of the present invention is indicated in its entirety by the reference numeral 1 and comprises a front gang 2 and a rear gang which is not shown but which is similar to the front gang. Each frame carries a plurality of pairs of bearing standards 7 and 8, each pair being disposed in downwardly converging relation and welded at their upper ends to the frame bars 5 and at their lower ends are secured to a disk gang bearing unit 10. So far as the present invention is concerned, the latter is of conventional construction and provides for the reception of a gang bolt 11 on which disks 12 are disposed, with their spacing spools 13 between the disks. The front and rear gangs 2 and 3 are pivotally interconnected for movement into and out of angled and transport or parallel positions by a pair of angling links or other suitable means, as desired.

The harrow 1 is adapted to be connected to a source of power, such as a farm tractor, by a hitch structure, indicated in its entirety by the reference numeral 40. The hitch structure 40 comprises a hitch bar 41 having a bifurcated portion 42 formed at its forward end and apertured to receive a hitch pin 43 by which the harrow may be connected to the drawbar 44 of a tractor. The hitch structure 40 also includes a bracing member 47 which at its forward end is pivotally connected, as at 48, to the bar 41. The member 47 comprises two telescopically associated parts which have a plurality of apertures providing for attachment of one part to the other in different positions of adjustment. The telescopically associated parts are shown at 51 and 52.

An angling lever 56 is pivotally mounted, as at 57, on a forwardly extending bracket 58 that is fixed, as by welding or the like, to the front bar 5 of the front gang frame 4. The angling lever 56 is in the form of a bell crank, one arm 65 of which receives a pivot pin 71 by which the rear end of the hitch bar 41 is pivotally connected therewith. The other arm of the bell crank member 56 is indicated at 74 and is apertured to receive a quick-detachable pin 75 by which one end of an adjustable angle-determining means may be connected thereto. Such means will be referred to later in detail and is connected at its other end by a pivot pin 76 with a lug 77 carried adjacent one end of the front disk gang frame 4.

The angle-determining unit in which the principles of the present invention have been incorporated is shown as acting between the bell crank member 56 and the front gang 4 and is indicated in its entirety by the reference numeral 130. The unit 130 may be controlled, as will be described below, without requiring that the operator dismount from the tractor.

The angle-determining mechanism 130 comprises a pair of telescopically associated members 131 and 132 pivotally connected at their outer ends, as by the pivot pins 75 and 76, to the bell crank 56 and the apertured lug 77 on the front gang frame 4. The angle control member 131 comprises upper and lower bar sections 133 and 134 welded at their inner ends to strips 135 which form, in conjunction with the bars 133 and 134, a tubular or sleeve section 136 in which the inner end of the cooperating telescopically associated member 132 is received. The latter member comprises a square bar 137 and a pair of apertured lugs 138 welded to the outer end of the square bar 137, the apertures in the lugs 138 receiving the pivot pin 76. The upper and lower bars 133 and 134 of the angle control member 131 are provided with a plurality of apertures 141 adjacent the outer end of the member 131 and, inwardly thereof, another pair of apertures 142. The extension of the telescopically associated members 131 and 132 is limited by means of a stop pin 144 which is removably inserted in an opening 145 in the inner end of the square bar 137, the pin 144, when in place in the opening 145, being held rigidly in place by means of a locking screw 146. Access to the locking screw 146 is obtained through the opening 142 in the upper bar 133 of the member 131. By loosening and/or removing the locking screw 146, the stop pin 144, which engages the adjacent ends of the strips 135 to limit the outward movement of the member 132 relative to the member 131, may be removed. When the stop pin 144 is in place, as shown in Figure 1, backing the harrow serves to move the disk gangs from their operating or angled position into a parallel or transport position, during which action the bell crank 56 swings in such a direction as to draw the member 131 away from the member 132, but the pin 144 is positioned so that when the gangs reach their parallel position the ends of the strips 135 come up against the pin 144, thereby preventing the harrow gangs from moving past their straightened or transport position when the harrow is backed. As best shown in Figure 1, the openings 142 are so placed in the bars 133 and 134 that they come substantially in register with the inner end of the square bar 137 when the pin 144 lies against the adjacent ends of the strips 135.

When the stop pin 144 is detached from the bar 137, the harrow gangs may be swung past their transport or straightened position and into an oppositely angled position, by backing the tractor. This feature of the present invention will be referred to in more detail later. When a forward pull is exerted on the hitch 40 of the harrow and the outfit driven forwardly, the soil pressure against the disks serves to swing the gangs into an angled or working position. During this action the bell crank 56 is swung in such direction as to move the member 131 in telescoping relation with respect to the bar 132, and the harrow gangs continue to move into a position of increasing angle until the inner end of the bar 137 comes up against a stop or an abutment. In the instant form of the invention the angle-determining stop comprises a new and improved latch box unit 150 which will now be described.

The angle-controlling latch unit 150, with which the present invention is more particularly concerned, is mounted for sliding movement on the member 131 longitudinally thereof and along the line of apertures 141 and 142. The unit 150 comprises a latch box or frame made up of a pair of side plates 151 and 152 suitably connected together by intermediate and lower spacer bars 153 and 154 and at their upper edges by a generally circular abutment plate 155. The latter and the spacing bars 153 and 154 are provided with aligned apertures. A vertically disposed locking plunger 157 is disposed in the apertures in the intermediate bar 153 and the abutment plate 155 and extends upwardly above the surface of the latter member a distance sufficient to receive a generally horizontally disposed, operating lever 158 pivotally connected thereto. Preferably, the lever 158 is made up of a pair of bars 159 which are apertured to receive a pivot pin 161 that extends through a transverse opening in the upper or extended end of the locking plunger 157. The lever 158 extends in opposite directions from the pivot 161 and normally is disposed flat against the abutment plate 155 by virtue of a spring 162 which is disposed between the underside of the plate 155 and a stop washer 164 which is held in place by a pin 165 extending through an opening in the lower portion of the locking plunger 157, just above the intermediate spacer plate 153. An operating cable 166 is connected to the longer end of the lever 158, and the lower end 167 of the plunger 157 extends downwardly, when the lever 158 lies flat against the plate 155, a distance sufficient to enter, and thereby be latched to, any selected opening 141 in the upper bar 133. The plunger 157 does not enter the openings in the lower bar 134, but the latter bar is apertured like the upper bar 133 to provide for convenience in manufacture and assembly. An abutment in the form of a crossbar 171 is carried by the lower portions of the side plates 151 and 152 and extends laterally outwardly through openings 172 formed in the side plates 151 and 152. The outer ends of the bar 171 are apertured to receive cotters 173 or the like to which the adjacent ends of a pair of springs 175 and 176 are connected. The other ends of the springs 175 and 176 are connected to an anchoring hook or yoke 177 which, as best shown in Figure 1, is secured, as by welding, to the outer end of the upper lug 138 of the member 132. The crossbar 171 is disposed in the path of movement of the forward or inner end of the bar 137 and, when the latch box unit 150 is locked to the member 131, the bar 171 serves as a stop limiting the movement of the bar in an inward or retracting direction. Normally, the rope or cable 166 extends from the outer end of the latch control lever 158 toward the operator's seat on the tractor, the locking plunger 157 and the control lever therefor being free to swing around the generally vertical axis of the plunger 157.

As will be understood by those skilled in the art, offset disk harrows are usually adapted to be angled in working position either to the right or to the left. For example, the harrow shown fragmentarily in Figure 1 is adapted to be angled in working position to the right, but the harrow may be arranged to be angled to the left merely by reversing the arrangement of the hitch 40. This disposes the tractor in a different position relative to the harrow and hence the cable 166 and lever 165 lie in a somewhat different position relative to the latch box or frame 150. The lever 158 and plunger 157 are freely swingable about the axis of the plunger, and in any position of the lever 158 about the axis of the plunger 157, a generally upwardly directed pull on the cable 166 causes the other end of the lever 158 to act against the abutment plate 155 and raise the plunger 157 until the lower end moves out of the associated aperture 141 in the upper bar 133. This frees the latch unit 150 for movement along the bar 131, either to another of the apertures 141 or to the aperture 142, in which case release of the cable permits the spring 162 to move the lower end of the plunger 157 into the opening 142, thereby disposing and locking the stop member 171 in a position substantially against the inner end of the bar 137, with the stop member 144 of the latter against the ends of the strips 135. In this position of the parts the angle control unit 130 is locked in its extended position, which maintains the harrow gangs straightened in their transport position.

The operation of the angle-control mechanism as described above is substantially as follows. Assuming that the harrow is in its straightened or transport position, to bring the same into a working position the operator drives the tractor forwardly. The harrow gangs will automatically move into their angled or working position, the bar 137 moving into a retracted position relative to the companion bar 131 until the inner end of the bar 137 comes up against the stop member 171 of the latch unit 150, assuming that the latter is in a working position adjacent the outer end of the member 131, as shown in Figure 1. If, for example, the locking plunger 157 is disposed in one of the intermediate openings 141, and that the operator desires to increase the angle between the disk gangs, all the operator has to do is to exert a pull on the cable 166 which raises the plunger 157 out of the intermediate opening 141 and then drive the tractor forwardly, whereby the soil pressure against the disks acts to increase the angle between the disk gangs, whereupon the bar 137 moves further inwardly of the bar 131 moving the latch unit 150 relative to the bar 131. When the disk gangs reach the position desired by the operator he releases his hold on the cable 166, permitting the plunger 157 to enter into an adjacent opening 141, thereby terminating further retracting movement of the angle-determining unit 130 and thereby locking the gangs in the angled position selected.

If, on the other hand, a reduced angle of operation is desired, the operator stops the tractor, pulls on the cable 166 to lift the plunger 157 from the associated opening 141 and then backs the tractor. The soil pressure against the disks when backing the outfit serves to reduce the angle, and as the angle between the disk gangs is reduced the corresponding movement of the bell crank 56 draws the member 131 away from the member 132, and as this occurs the springs 175 and 176 cause the latch box unit 150 to move substantially with the inner end of the bar 132, relative to the bar 131. Therefore, when the desired reduced angle is reached, the operator releases his hold on the cable 166, permitting the plunger 157 to enter an adjacent opening 141, thereby limiting further angle-reducing movement of the latch box 150. Then the tractor is driven forwardly and the angle of the gangs increased until the inner end of the bar 137 comes up against the stop bar 171 in the new position of the latch unit 150.

If it is desired to transport the harrow, as along headlands, roads and the like, with the gangs in their straightened position, the operator backs the tractor while pulling upwardly on the cable 166 to release the plunger 157 from the opening 141. Then as the harrow approaches and reaches its straightened or transport position, with the latch unit 150 following the inner end of the bar 137, the plunger 157 is permitted to enter the opening 142 by the operator releasing the cable 166 when the disk gangs reached their straightened position. Thereafter, so long as the latch box 150 is retained in this position, the disk gangs are held or locked in their straightened or transport position, and the harrow may then be driven either forwardly or backwardly as desired without having the disks move out of their transport position.

When the latch box 150 is in an operating position, as indicated in Figure 1, and it is desired to back the outfit, it is not necessary for the operator to do anything to the latch box unit 150. Backing of the harrow in its operating position, with the latch box 150 locked to the outer end portion of the angle-control member 131, results in a straightening movement of the disk gangs, but when the pin 144 comes up against the strips 135, the disk gangs are held against moving past their straightened position while backing the outfit. Therefore, the outfit may continue to be backed as long as desirable without changing the position of the latch unit 150. Then, when forward travel is resumed, the harrow automatically goes into its operating position and at the same angle as before, as determined by the unchanged position of the latch unit 150.

While we have shown and described above the preferred structure in which the principles of the present invention have been incorporated, it is to be understood that our invention is not to be limited to the exact details shown and described above, but that, in fact, widely different means may be employed in the practice of the broader aspects of our invention.

What we claim, therefore, and desire to secure by Letters Patent is:

1. In a disk harrow or the like having a pair of telescopically associated members, the improvement comprising a latch unit adapted to be mounted on one of said members and including a frame receiving said one member and adapted to be fixed at one end in upright relation to said one member, a locking plunger mounted for both rotation and axial displacement in said frame and extending outwardly therefrom at the upper end of said frame, and a lever pivoted to the outer end of said plunger and bearing at one end against the upper face of the outer end of said frame, said lever being movable into different positions about the axis of said plunger, whereby movement of said lever about its pivotal connection with said plunger in any of said positions acts against the upper face of said frame to shift the plunger axially into and out of locking position relative to said members.

2. A latch unit for agricultural machines and the like, comprising a frame, a locking plunger movable axially and rotatably therein, said frame having an abutment plate apertured to receive an end of said plunger which extends therethrough, said plate lying in a plane substantially perpendicular to the axis of rotation of said plunger, and an operating lever pivoted to the extended end of said plunger and having an end fulcruming on said abutment plate in any position to which the plunger may be rotated.

3. A latch unit for agricultural machines and the like, comprising a frame, a locking plunger movable axially and rotatably therein, said frame having an abutment plate apertured to receive an end of said plunger which extends therethrough, said plate lying in a plane substantially perpendicular to the axis of rotation of said plunger, an operating lever, means pivotally connecting said lever to the outer end of said plunger in such a position that said lever normally lies against said plate, substantially engaging the latter at opposite sides of the outer end of said plunger, and means connected with one end of said lever for causing the other end to fulcrum on said abutment plate and shift said plunger in any position to which the plunger may be rotated.

4. The invention set forth in claim 3, further characterized by spring means acting against said frame and against said plunger for holding the latter in an inner position relative to said frame and holding said lever substantially flat against said abutment plate.

References Cited in the file of this patent
UNITED STATES PATENTS

| Number | Name | Date |
|---|---|---|
| 1,793,746 | Olson | Feb. 24, 1931 |
| 2,255,380 | Curtis | Sept. 9, 1941 |
| 2,377,521 | Rutter | June 5, 1945 |
| 2,430,143 | Rutter | Nov. 4, 1947 |